(12) United States Patent
Nelson et al.

(10) Patent No.: US 7,152,066 B2
(45) Date of Patent: Dec. 19, 2006

(54) INTERNET BASED SYSTEM FOR CREATING PRESENTATIONS

(75) Inventors: Steve Nelson, San Jose, CA (US); Chia-Hsin Li, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 625 days.

(21) Appl. No.: 10/071,156

(22) Filed: Feb. 7, 2002

(65) Prior Publication Data

US 2003/0149696 A1    Aug. 7, 2003

(51) Int. Cl.
*G06F 17/30* (2006.01)

(52) U.S. Cl. ............................ 707/9; 707/1; 707/203; 707/10; 707/100; 715/500

(58) Field of Classification Search ............... 707/203, 707/104.1, 513, 517, 100, 10, 1, 501, 204; 705/26, 10, 14; 446/404, 298, 397
See application file for complete search history.

(56) References Cited

U.S. PATENT DOCUMENTS

| | | | | |
|---|---|---|---|---|
| 5,678,041 | A * | 10/1997 | Baker et al. | 707/9 |
| 6,128,629 | A * | 10/2000 | Bretschneider et al. | 707/203 |
| 6,275,833 | B1 | 8/2001 | Nakamura et al. | 707/513 |
| 6,368,177 | B1 * | 4/2002 | Gabai et al. | 446/404 |
| 6,829,587 | B1 * | 12/2004 | Stone et al. | 705/26 |
| 2003/0033311 | A1 * | 2/2003 | Skinner | 707/100 |
| 2003/0135821 | A1 * | 7/2003 | Kouznetsov | 715/500 |
| 2004/0064374 | A1 * | 4/2004 | Cho | 705/26 |

FOREIGN PATENT DOCUMENTS

CN      1145489 A      3/1997

* cited by examiner

*Primary Examiner*—Charles Rones
*Assistant Examiner*—Belix M. Ortiz
(74) *Attorney, Agent, or Firm*—Rosalio Haro

(57) ABSTRACT

An internet presentation system includes an internet accessible server that permits specific types of access to a target presentation file by selected remote users. Only users having purchase access to the target presentation file may submit a purchase order for a copy of the presentation file. Each user is further restricted to the type of copy, video or data, of the presentation that the user can acquire. Users having purchase permission are further divided into owner status and buyer status. Users having owner status may grant or revoke the purchase permission of non-owner status users. At least one owner status user is additionally designated a super-owner, and can grant and revoke the owner status of other users. The super-owner user may relinquish its super-owner status to any other user.

58 Claims, 6 Drawing Sheets

NAME

ADDRESS

PAYMENT OPTION

BILL [X]    113    CREDIT CARD [ ]    115    BANK DRAFT [ ]    117

PROCEED — 119    CANCEL — 121

CREDIT CARD TYPE

VISA    Master Card    ..............    Other

— Card_1    — Card_2    — Card_n

CARD NUMBER    132

EXPIRATION DATE    133

SUBMIT — 135    CANCEL — 137

FIG. 8

INTERNET BASED SYSTEM FOR CREATING PRESENTATIONS

BACKGROUND OF THE INVENTION

1. Field of the Invention

The present invention relates to an internet presentation system and more specifically to an interactive web-based utility which enables a user to prepare, control access of, and purchase presentation files over the internet.

2. Description of the Related Art

Today, most users create their presentations on a computer using stand-alone application software. If a desktop computer is used to create a presentation and a different computer, such as a laptop, is then used to give the presentation, the software for creating the presentation must be installed on both computers. Usually, both computers must have the same version of the software; otherwise, one computer may not be able to correctly read the other's data file. The presentation file must therefore be transferred from the desktop to the laptop, which is typically done using a transferable storage device such as a Zip™ drive or floppy disks, or by using a local network. Even after loading the application software onto the laptop and transferring the files, there may be difficulties in assuring the laptop display the most current version of data objects within the presentation.

Situations may also arise where a user is at, or in route to, a presentation site while a coworker back at the home office needs to make changes to the presentation. Transferring and coordinating changes to the presentation file may be difficult, depending on the circumstances. A File may get corrupted during transfer by e-mail, and may not be reliable. The problems are compiled if the presentation on the desktop computer uses data objects linked to a database not accessible by the notebook computer, so that even if the presentation file is transferred to the laptop computer, the laptop computer will not be able to reproduce the presentation since it does not have access to the database storing the linked data objects.

An attempt to overcome some of these limitations is presented in U.S. Pat. No. 5,781,190 wherein a presentation saving utility attempts to save many of a presentation's attributes into re-installable, presentation packaged. For example, if the original presentation file has data objects linked to a database, the saving utility will replace the links with copies of the current data values. Additionally, a functional copy of the presentation application itself is added to the presentation package. When the presentation is transferred to another computer, such as a laptop computer, the presentation package is re-installed onto the laptop computer. However, since a functional presentation application is included, along with the presentation file, image objects and data objects, the re-installable, presentation package can be very large and may span multiple floppy disks. This not only makes it difficult to transfer, but also complicates management of the presentation since the entire presentation package would be unusable if any of the floppy disks is misplaced. Additionally, this approach does not address the issue of coordinated access to a presentation file by multiple users, such as when a person at a home office needs to edit a presentation that is to be presented by another individual at a different location. Additionally, this approach requires that both machines be compatible with each other since both must support the same application software.

Another issue of concern is maintaining control of one's presentation file after it has been made available to others. That is, it is likely that when the owner of a presentation file gives someone a copy of the presentation file, the person receiving the copy may modify it such that multiple version of the presentation file may exist without the owner's consent. This problem is exasperated as the person who originally received the copy of the presentation file, in turn makes a new copy for someone else, who then makes more copies for more people.

It is therefore an object of the present invention to provide a presentation access system by which an individual may be more selective of who may obtain a copy of a presentation file.

It is another object of the presentation to better control who receives modifiable versions of a presentation file, and who receives non-modifiable version of a presentation file.

It is still another objection of the present invention to provide a system for providing an internet presentation file access service to multiple remote users for a fee.

SUMMARY OF THE INVENTION

The above objects are met in system that includes a network server providing an internet accessible, presentation creation and retrieval service to a remote user. The remote user may remotely create a presentation on the network server using the presentation creation service. The creator of the presentation file may then give any of edit access, execution access, and purchase access to other remote users.

When a remote user logs onto the network server, the network server permits the remote user execution access only to those presentation files to which it has been granted execution access, permits the remote user edit access only to those presentation file to which it has been granted edit access, and permits purchase access only to those files to which it has been granted purchase access. For example, if the creator of a presentation file wants others to be able to view and execute the presentation, such as when the presentation file is presented at a customer site, then the owner of the file may grant the others only execution permission.

If a group of people are working together on a presentation, then the owner of the presentation file may grant everyone in the group edit permission, which preferably includes an implicit granting of execution permission. Thus, multiple users at different sites may edit the same presentation file. Since the network server maintains a record of everyone's edits on a presentation file, the owner of a presentation file is always aware of what changes have been made and by whom.

Lastly, only users having purchase permission may obtain a copy of the presentation file. However, preferably only the creator of the presentation file is automatically granted purchase permission. It is preferred that the purchase operation include a monetary payment. However, in an alternate embodiment of the present invention, the payment may be a symbolic acknowledgement by the remote user without any monetary payment. Once a presentation file is purchased, a copy is sent to the buyer. The copy may be downloaded via the internet, or may alternatively be transferred onto a selected recording medium and sent via normal postal services to the remote user. In a preferred embodiment, the creator of a presentation file may grant purchase permission to other remote users. Thus, although several people may modify a presentation file on the network server, only a select number of remote users may obtain copies of the presentation file.

Furthermore, the presentation creation and retrieval service further preferably provides one of two types of copies to remote users that have purchase permission for a presentation file. A first type of copy is a video recording of an executed run of the presentation file. Such that even after having the copy of the presentation file, which may be recorded onto a video DVD, a video Cd, or a video cassette, the presentation file itself cannot be copied. The second type is a copy of the data file of the presentation, which may be recorded onto a data DVD, a data Cd, or a computer readable magnetic data medium. The data copy can be modified, by the purchaser. Thus, the owner of the presentation file, in addition to selecting what remote users can purchase the presentation file, may also dictate what type of copy (i.e. video or data) the remote users may purchase.

In a preferred embodiment, remote users granted purchase permission are also assigned one of an owner status and a buyer status. As stated above, the users having owner status (i.e. the owners of a file) may grant and withdraw edit, execute, and purchase permission to other users. Additionally, the users having owner status may dictate what type of copy the users having buyer status may purchase. That is, an owner-status user may restrict a buyer-status user to purchasing only video copies of the presentation file. Additionally, those having owner status may further remove purchase permission from remote users that have only buyer status. When granting purchase permission to a remote user, it is preferred that the remote user also be assigned one of an owner status and a buyer status.

The creator of a presentation file is preferably automatically granted a super-owner status, which permits creator to remove purchase permission from remote users that have owner status, and to grant purchase permission (and grant owner or buyer status) to other remote users. The creator of a presentation file may relinquish its super-owner status to any other remote user. This permits change of leadership among multiple remote users working as a group on a common presentation file.

To facilitate the purchase of a presentation file, a remote user may store within the remote server multiple purchase and delivery options. For example, the remote user may submit a preferred payment method, a preferred file delivery method, a preferred recording medium (i.e. DVD, CD, cassette), and a preferred file type, i.e. video type or data type.

In an alternate embodiment, the remote users pays a periodic subscription fee for access to the network server, and one payment option is to have the price of purchased presentation files added to the subscription price of the next-due service period.

BRIEF DESCRIPTION OF THE DRAWINGS

In the drawings wherein like reference symbols refer to like parts:

FIG. 7 is an exemplary electronic payment selection form in accord with the present invention.

FIG. 8 is an exemplary electronic charge card payment form in accord with the present invention.

DESCRIPTION OF THE PREFERRED EMBODIMENTS

Figure 1:
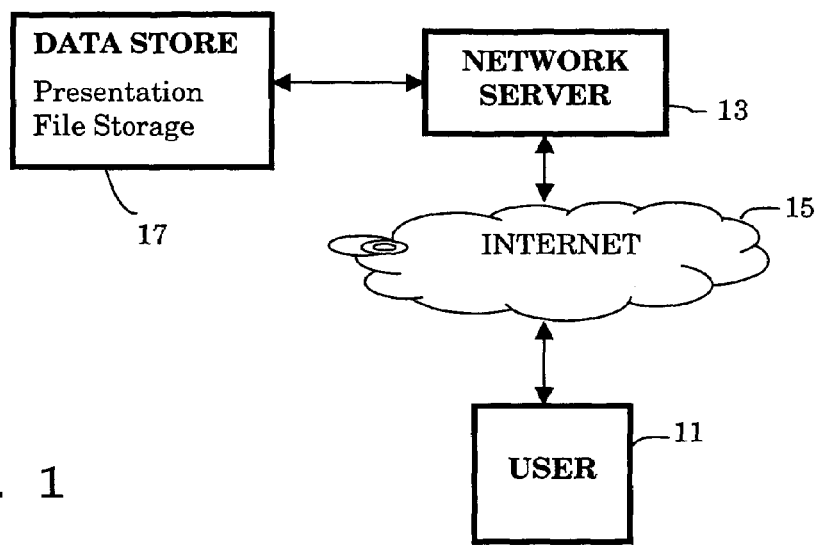
FIG. 1 is a block diagram of a presentation creation and access system in accord with the present invention.

With reference to FIG. 1, a user on a remote computing device 11 may communicate with a network server 13 over the internet 15. Preferably, network server 13 maintains a record of registered users and their associated identification information. If user computing device 11 wishes to gain access to network server 13, then it would submit identification information, such as user ID and user password to network server 13 over the internet. If network server 13 can correlate the submitted identification information with one of its registered users, then it will grant access, including any permission access parameters associated with the identified registered user, to user computing device 11. If no existing registered user is properly identified, then network serve may invite user computing device 11 to register itself as a new user. Alternatively, network server 13 may register computing device 11 as a temporary visitor and grant it limited file creation permissions, and access to existing files only as determined by specific password access permissions associated with specific files. For example, some files may permit purchase permission on a password access basis, such that a visitor to network server 13 who is not a previously registered user may still purchase a copy of presentation file by submitting an appropriate password associated with the presentation file and created by the owner of the presentation file. Preferably, the owner of the presentation file may further limit the purchase of the presentation file to a specific copy type, video or data, as is more fully explained below.

As shown, network server 13 has access to a data store 17, which maintains a plurality of presentation files. Although data store 17 is shown separate from network server 13, it is to be understood that data store 17 may be an integral part of network server 13.

Once user computing device 11 has been granted access to network server 13, user computing device 11 may gain access to selected presentation files stored in data store 17, or may alternatively create a new application file using resources on network server 13.

As explained above, presentation files are typically created using one of a plurality of commercially available stand-alone software applications, such as MS® PowerPoint™ and Corel® Presentations™. As it is likewise shown, such presentation are similar to slide shows, but may incorporate video clips and audio/video effects. To assure continuity and consistency of a presentation, however, the network server 13 of the present invention preferably uses a Java-based presentation creation and execution application. This is because Java is ideally computer platform independent, and can thus run on many types of computing devices, as long as they support a Java engine. Since most internet web-browsers and many internet access devices incorporate a Java engine, using a Java-based application eliminates many of the difficulties associated with maintaining a consistent file presentation between different computing devices. If user computing device 11 does not have the required Java-based presentation creation and execution application, then it may downloaded through the internet 15, and the application is preferably provided by network server 13. Thus, when user computing device 11 accesses a presentation file from data store 17, it is executed and edited using the Java-based presentation and execution application, with the types of edit and execution permissions granted to user computing device 11 being determined by network server 13.

Figure 2:
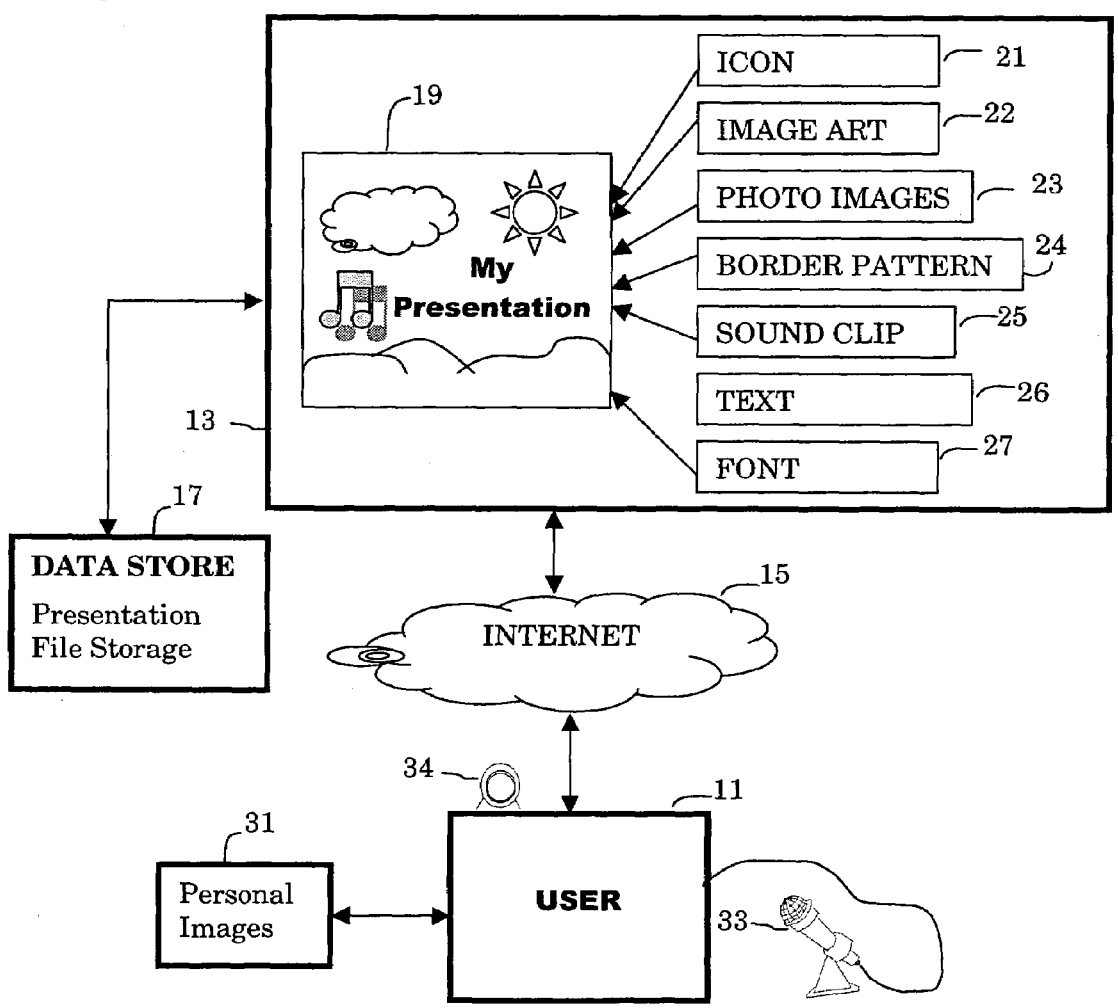
FIG. 2 is a more detailed block diagram of the system of FIG. 1.

With reference to FIG. 2, user computing device 11 may create a presentation 19 within network server 13. Alternatively, the presentation may be created within user computing device 11, and then transferred to network server 13 for storage in data store 17 once edits to the presentation are completed. Irrespective of whether the Java-based application used to create the application is run in network server 13, user computing device 11, or a combination of both, it is preferred that the data objects 21–27 (i.e. text, images, sound, etc) used in the creation and edit of presentation 19 be a combination of objects provided on network server 13 and objected provided by user computing device 11. User computing device 11 may provide video objects, sound objects, image objects, etc. form its own permanent store, or it may incorporate such objects from removable memory, such as a data CD 31 having a plurality of personal images. Alternatively, user computing device 11 may create video and still image objects using a digital cameral 34, and may create sound objects using a microphone 33 or other audio input device. However, once the presentation 19 is ready to be stored in data stored 17, all objects used in its creation (including any provided by user computing device 11) must also be stored in data store 17 along with presentation 19.

Figure 3:
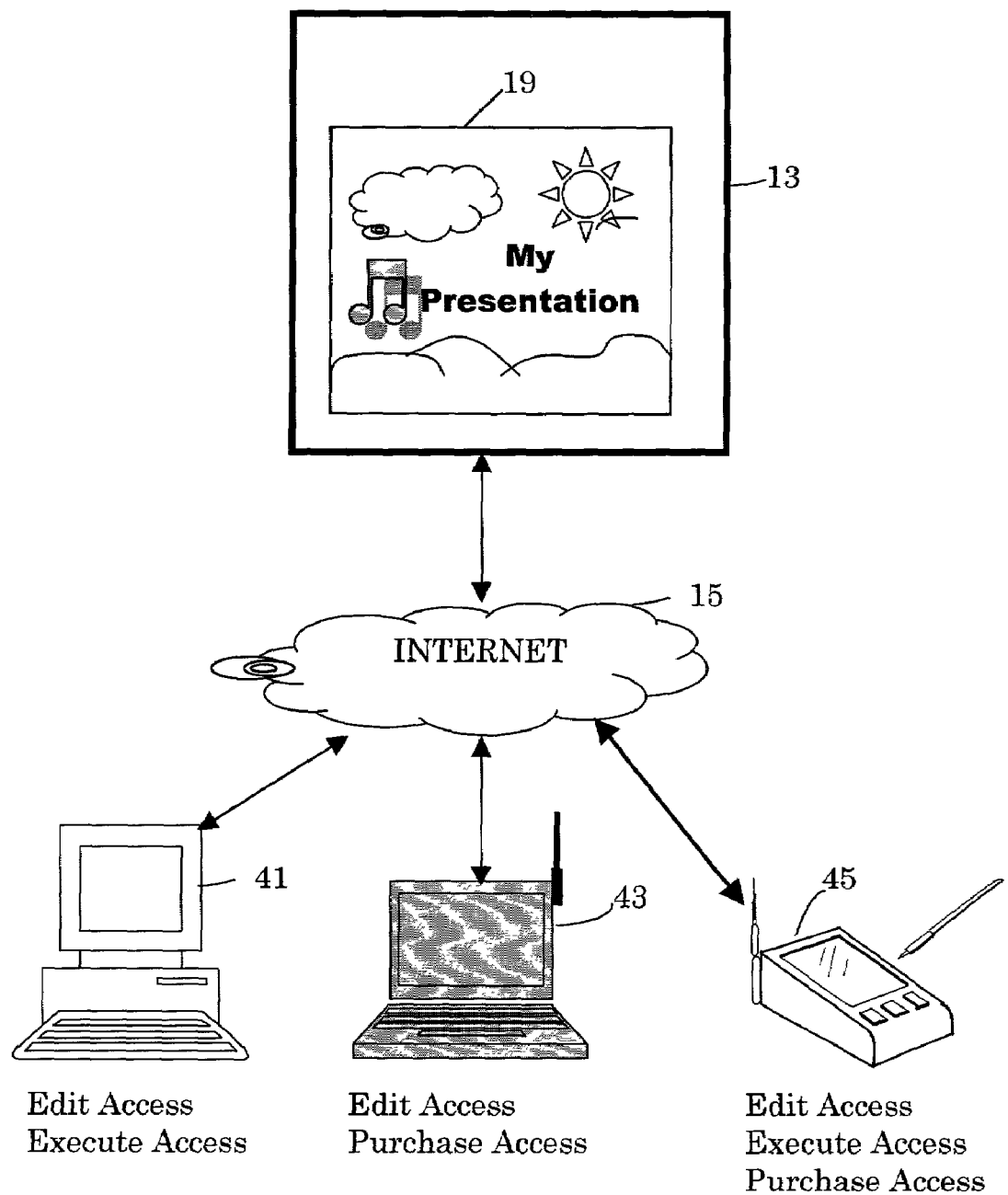
FIG. 3 is a second block diagram of a presentation creation and access system in accord with the present invention.

With reference to FIG. 3, once a presentation file 19 is stored in network server 13, it may be accessed from a plurality of remote locations using a plurality of computing device 41–45. As explained above, all computing devices 41–45 execute presentation file 19 using a java-based application. As a result, presentation file 19 may be run on a plurality of computing devices using a plurality of operation system platforms. For example, computing device 41 may use a Windows™ or Linux based platform, computing device 43 may use an Apple® provided OS platform, and computing device 45 is a hand-held computer, such as a personal data assistant, PDA having either a hardware or software implemented java engine. Furthermore, computing device 41 is shown accessing the internet using a line connection, such a telephone, cable, or ISDN connection, and computing devices 43 and 45 are shown accessing the internet using wireless connection.

As explained above, network server 13 assigns permissions to remote computing devices 41–45 as they are granted access to network server 13. In the present example of FIG. 3, computing device 41 is granted edit access and execute access to presentation file 19. As a result, computing device 41 may edit presentation file 13, and commit the changes, i.e. save the changes, to network sever 13, but may not purchase a copy of the presentation file. Preferably, network server 13 maintains a record of all edits to a presentation and the identity of the user that committed the edits.

Computing device 43 is illustratively granted execution access and purchase access. As a result, computing device may run, i.e. execute, presentation file 19, but may not edit presentation file 19. Additionally, network server will accept a purchase order for presentation file 19 submitted by computing device 43. Preferably, the purchase of a presentation file 19 is an exchange for payment service.

Alternatively, the purchase of a presentation file may be a non-monetary transaction in which network server approves the transfer of a copy of presentation file 19 to computing device 43 without any monetary charges due to computing device 43 being identified as have a predetermined special status. For example, it is preferred that each of computing device 41–45 be granted access to network server 13 on a periodic paid subscription, and there may be various type of subscription levels. On a first subscription level, a subscriber may be required to pay for each purchased copy of a presentation file. On a second subscription level, which may cost more than the first subscription level, a subscriber is permitted to obtain a predetermined number of presentation files copies without additional chargers. In still an alternate embodiment, no periodic subscription payment is required to access network server 13, but a remote user is required to pay for copies of presentation files. In still an alternate case, the copies of presentation files may be available as either direct downloads through the internet 15, or recorded onto a transferable storage medium (such as a DVD, CD, or cassette) and mailed to the user via normal postal services. In this case, it the user may be granted a free copy of a presentation file if it is downloaded via the internet 15, but required to pay for transferable copies mailed to the user via normal postal services.

Computing device 43 is shown having only execute access and purchase access. As a result, computing device 43 my run, i.e. execute, presentation file 19, and submit a purchase order for presentation file 19, but may not make any edits to presentation file 19. Thus, the users of computing devices 41 and 45 may be part of a team working on the preparation of presentation 19, but the user of computing device 43 may only evaluate presentation 19, and purchase it if desired.

Various levels of permissions are available in the preferred presentation creation and access system. A user that has purchase access, may be given the choice of type of copy that the user may purchase. Alternatively, the use may be restricted to a specific type of copy. For example, it is desirable that purchased presentations be available as both a video type copy and an executable data type copy.

The video type copy is preferably a video transfer, i.e. a video recording, of an executed run of the presentation file. The recording may be made in accordance to a specific executed run of the presentation file (such as one made by the owner of the presentation file), or it may be a recording automatically generated by inserting a specified, or predetermined, pause period between progressive slides of the presentation file, i.e. between presentation pages. The video recording is preferably recorded onto one of various video recording mediums (i.e. video DVD, video CD, and video cassette) available for selection by the user.

In the presently preferred embodiment, the executable data type copy has a data format file that permits it to be edited and executed using the above described Java-based presentation application. A purchaser of the executable data copy may there modify the copied application file after purchasing it.

In an alternative embodiment, when a user purchases an application in an executable data type, then for an added fee, the user may select from a predefined list of available alternate data formats suitable for different presentation applications. In this case, the presentation is converted from the Java-based application format to the selected format used by the presentation application preferred by the user. For example, if a purchaser wishes to run a purchased application file using the Corel® Presentations™ application, then the purchased presentation file is first converted from a format suitable for the Java-based application in which it was originally created to a format suitable for the Corel® Presentations™ application prior to being sent to the user. The purchased presentation may be stored onto a data DVD, data CD, a data cassette, a solid state memory medium, or other type of computer readable data format, and mailed to the user via normal postal services.

Figure 4:
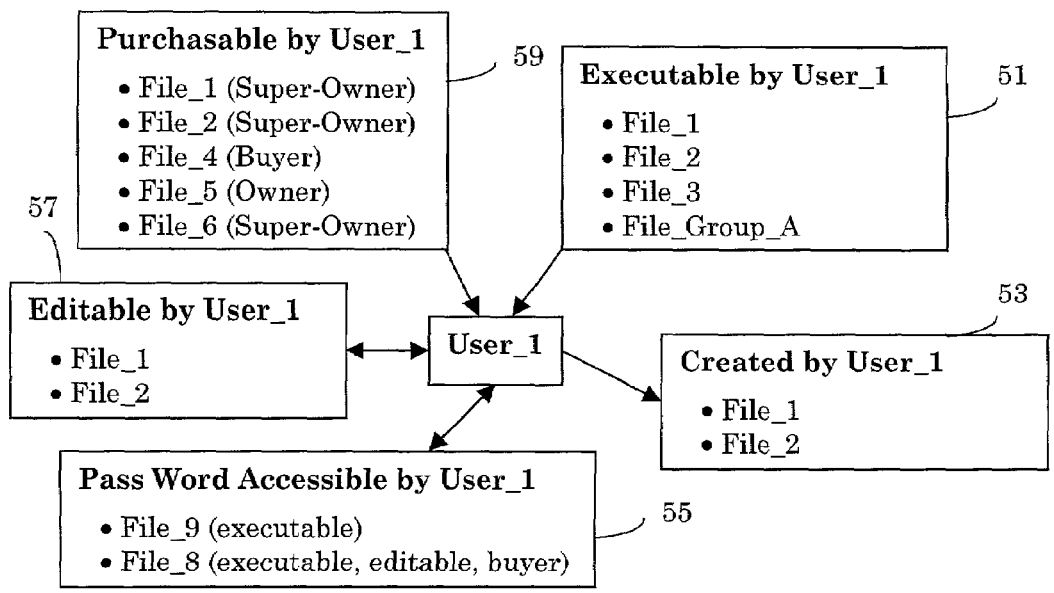
FIG. 4 is an organizational block diagram for correlating user permissions with a plurality of presentation files in accord with the present invention.
Figure 4:
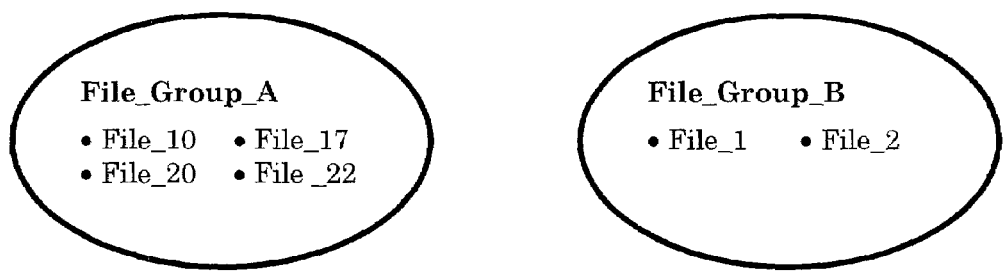
Figure 4:
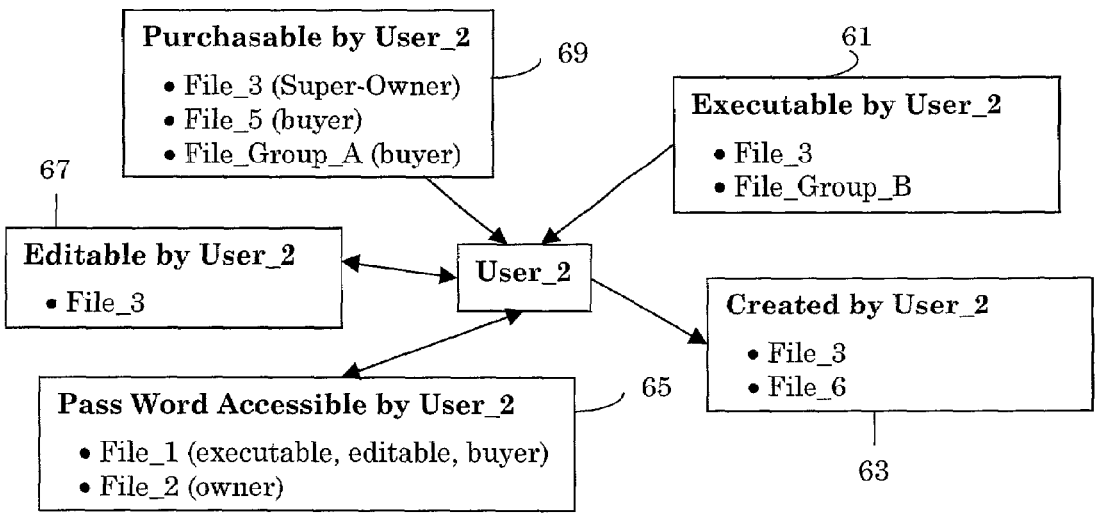

With reference to FIG. 4, an example of available permission types and permission levels assignable to two exemplarity users, i.e. User_1 and User_2, in accord with the presently preferred embodiment are shown. The permission types and permission levels that may be associated between a user and various presentation files are divided into five permission groups, i.e. 51–59 associated with User_1 and 61–69 associated with User_2. Groups 59 and 69 additionally show permission level associations.

The five shown groups are: files created by a user, collectively identified as groups 53 and 63 respectively associated with User_1 and User_2; files to which a user has execution-access permission, collectively identified as groups 51 and 61 respectively associated with User_1 and User_2; files to which a user has edit-access permission, collectively identified as groups 57 and 67 respectively associated with User_1 and User_2; files to which a user has purchase-access permission, collectively identified as groups 59 and 69 respectively associated with User_1 and User_2; and files to which a user has password dependent access, collectively identified as groups 55 and 65 respectively associated with User_1 and User_2.

Purchase permission access has three permission levels; buyer, owner, and super-owner. If a user has buyer-level purchase permission to a file, then the user may purchase the file, but has no control over who else may also purchase the file. Additionally, a user having buyer-level permission access is preferably also restricted to the type of files that may be purchased. For example, the user may be restricted to purchasing a file only in a video type format or only in a data type format. A user having owner-level purchase permission is not only free to purchase a copy of a file (and preferably choose either of a video type or data type format for the copy), but may also grant purchase permission to other users that do not yet have purchase permission. Additionally, an owner-level user may remove purchase permission from a buyer-level owner. Preferably, an owner-level user may also specify the type of copy (i.e. video type or data type) that a buyer-level user may purchase. Alternatively, an owner-level user may also grant a buyer-level user the option of selecting among either a video type or data type copy of a file.

In an alternate embodiment, when granting purchase permission to another user, a owner-level user may also assign the other user one of an owner-level status or buyer-level status. In the preferred embodiment, however, all users granted purchase permission by an owner-level user are automatically granted only buy-level status, and only the user having super-owner status (i.e. having super-owner level, purchase permission) may grant owner-level status to another user. In addition to the ability to granting owner-level permission in either embodiment, a super-owner level user may also remove purchase permission from an owner-level users. Also a user having super-owner status may change the current purchase permission level of another user to that of a buyer-level permission.

The users having super-owner level and owner-level purchase permission preferably may also affect the groups of execution permission (51 and 61), edit permission (57 and 67), and password access permission (55 and 65). For example, a user that has super-owner status associated with a presentation file (and preferably also a user having owner-level purchase permission) may grant to, or remove from, another user execution permission, edit permission, and password access permission of the presentation file.

It is preferred that each file be limited to one user having super-owner status. In this case, a user having super-owner status may relinquish its super-owner status to another user. When doing this, the user that had super-owner status preferable is granted the purchase permission level of the other user. For example, if a first user having super-owner status exchanges purchase permission levels with a second user having owner-status, then after the exchange, the first user will have owner-level status and the second user will have super-owner status. Alternatively, when a first user having super-owner status relinquishes it super-owner level purchase permission to a second user, the first user is automatically granted owner-level purchase permission irrespective of the purchase permission status or level status of the second user.

In an alternate embodiment, multiple users may have super-owner status associated with a particular file. In this case, a first user having super-owner status may grant super-owner status to a second user without the first user relinquishing its super-owner status. Additionally, a user having super-owner status may alter its own permission level status to that of owner-level status. This is permissible only if there still remains at least one other user who also has super-owner status. That is, it is preferred that each presentation file having at least one super-owner level user associated with it.

In the preferred embodiment, the creator of a file is automatically granted super-owner purchase status for that file. For example according to group 53, User_1 is the creator of presentation files File_1 and File_2, and thus group 59 shows that User_1 also has super-owner status for File_1 and File_2. Group 59 also shows that User_1 has been granted owner-level purchase permission to File 5, and granted buyer-level purchase permission to File_4.

More interestingly in reference to User_2, group 63 shows that User_2 is the creator of File 6, but as shown in group 69, User_2 has only a buyer-level purchase permission associated with File_6. Furthermore, Group 59 shows that User_1 has super-owner level permission for File_6. Thus, it will be understood that the currently shown permission levels were achieved as a result of User_2 relinquishing its super-owner status to User_1. Furthermore, after obtaining super-owner status, User_1 then assigned User_2 a buyer-level purchase permission for file_6.

A user may also be granted password accessibility to a particular file. A particular type of access may also be associated with each password. For example, group 55 shows that User_1 has password access that grants execution permission to File_9. Thus, if User_1 submits the correct password for File_9, then User_1 will be able to execute, i.e. run, the presentation embodied by File_9, but will not be able to edit or purchase File_9. In the present example, User_1 also has password access to File_8. In this case, however, if User_1 accesses File_8 by submitting the appropriate password, User_1 will be granted execution permission, edit permission, and buyer-level purchase permission to File_8. In the present example, one password grants multiple, specified permissions to a particular file, but in an alternate embodiment, a file may require a different password for each permission, i.e. execute permission, edit permission, etc. It is preferred that password permission for a target presentation file be assigned to a selected user by another user that has either owner-level status or super-owner level status associated with the target file.

Additionally, the owner of a file may define password access to a presentation file without specifying a specific user with whom the password is associated. This type of globally available password access (i.e. available to all users) provide password access to users who are visiting network server 13, and are not pre-registered. Thus a visitor to network server 13 may achieve executable access to a specific file if the specific file has a globally available password for permitting execution access. Any of the above described permissions and permission levels may be made globally available though password access.

Lastly, it is preferred that multiple files be combinable into file groups that can be associated with particular permission groups for each user. For example, File_Group_A is shown in group 51 to have execution permission associated with User_1. Thus, User_1 has execution permission for all files within File Group_A. That is, User_1 has execution permission to File_10, File_17, File_20 and File_22.

Similarly, File Group_B, which is comprised of File_1 and File_2 is shown within group 61, and thus User 2 is granted execution permission access to all files within File_Group_B. Group 65 further shows that User_1 has granted password permission access to File_1 and File_2 specifically to User_2. As dictated by the permissions provided by User_1, User 2 may gain execution access, edit access, and buyer level purchase access to File_1 buy submitting the appropriate password. Although User 1 provided User_2 with only owner-level password access to File_2, once User_2 has gain owner-level purchase access to file_2 by submitting the appropriate password (provided by User 1) to networks server 13, User_2 can grant itself edit access and execution access to File_2.

Lastly, groups 63, 61, 67, and 69 show that User_2 has retained Super-owner status, edit permission and execution permission for File_3, which it created.

In the present embodiment of FIG. 4, any user may construct a file group, but only the owner-level user or super-owner level user of a target file may incorporate the target file into the constructed file group. For example, File_Group_B may have been created by User_2, but it would have remained empty until User_1 added File_1 and File_2 (to which User_1 has super-owner status) into File_Group_B. Thus, it is possible to have an empty-set file group within the above described, permission access groups.

Figure 5:
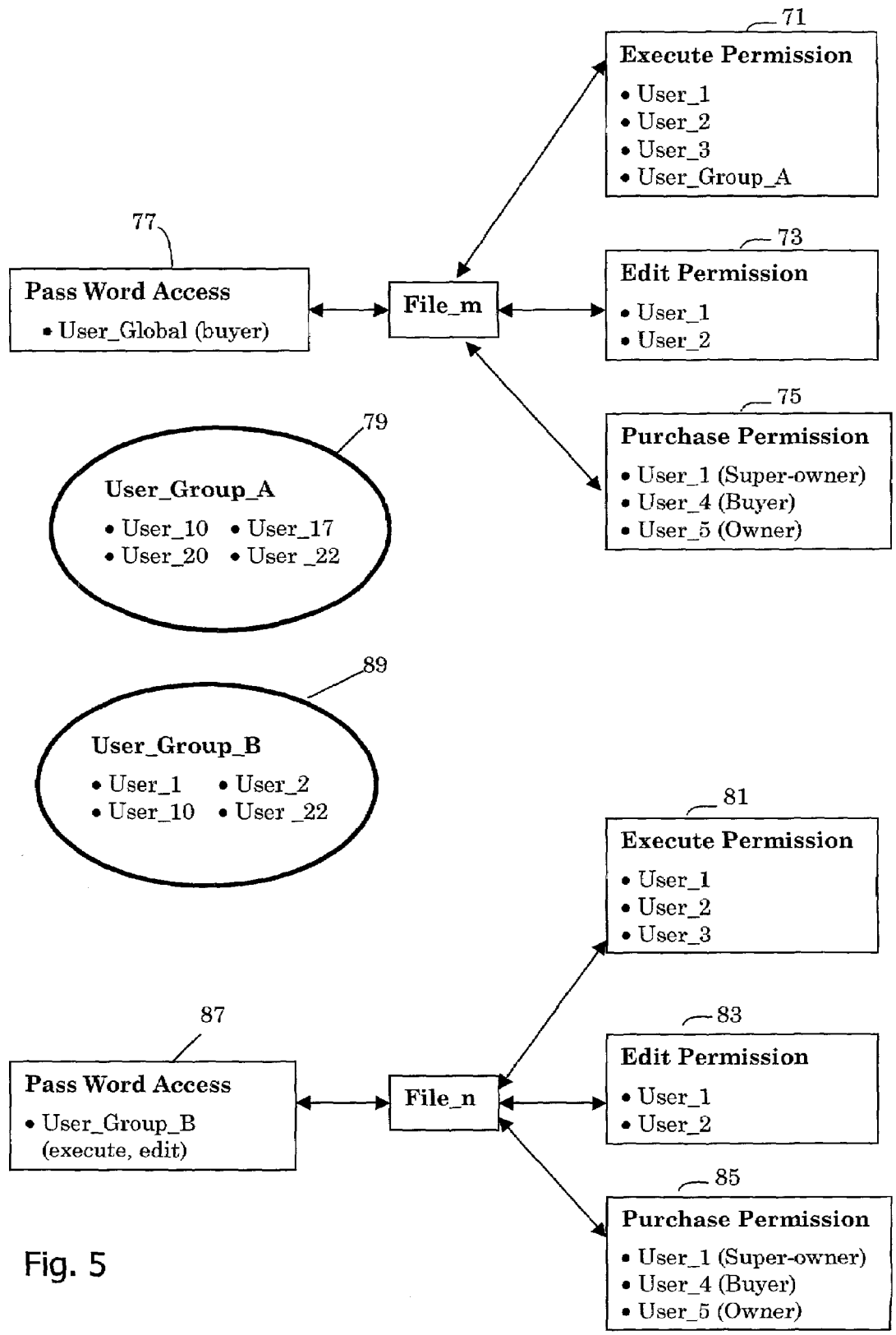
FIG. 5 is an alternate organizational block diagram for correlating user permissions with a plurality of presentation files in accord with the present invention.

With reference to FIG. 5, an alternate system for associating user permissions with presentation files uses four user groups for each presentation file. Specifically, each presentation file, such as File_m and File_n, has: an execute permission user group (71 and 81 respectfully associated with File_m and File_n) that lists all users having execute access to the presentation file; an edit permission user group (73 and 83 respectfully associated with File_m and File_n) that lists all users having edit access to the presentation file; a purchase permission user group (75 and 85 respectfully associated with File_m and File_n) that lists all users having purchase access to the presentation file; and a password access user group that lists all users having password access to the presentation file.

Additionally, multiple users may be collected into user groups, such as User_Group_A and User_Group_B, and when a specific permission access is assigned to a particular user group, it is automatically also assigned to all users within the user group. For example, User_Group_A 79 is listed within execute permission group 71, and therefore User_10, User_17, User_20 and User_22 are granted execute access to File_m.

Like in the previous case, one of a buyer, owner, and super-owner status is preferably associated with each user within the purchase permission user group 75. Like in the case FIG. 4, users having a buyer status may either be restricted to the type of copy (video or data) of a presentation file that they may purchase, or may alternately me granted the choice of copy type. Also like in the case of FIG. FIG. 4, owner status users may grant or remove purchase permission to other users that do not have owner status or super-owner status. Also, users having super-owner status may grant owner status purchase permission to any other user not having super-owner status, or may remove purchase permission from any other user not having super-owner status. In a manner similar to that described above, a user is preferably assigned one of a buyer status, owner status, or super-owner status when first granted purchase permission.

Each file also has associated with it a password access group in which is listed all users that have been granted specific types of password accessible access to the particular file. For example, group 77 shows that User_Global can gain buyer level, purchase permission to File_m by providing the appropriate password to network server 13. In the present case, the identifier "Global" in "User_Global" indicates that this is a globally available password access. As explained above, password access may be selectively assigned to a specific users, or may alternatively be made available to all users, including visitors, by making the password access global. Group 87 further shows that all the members of User_Group_B (collectively identified within circle 89) may gain edit and execute access to File_n by submitting the appropriate password to network server 13. Like in the embodiment of FIG. 4, password access may be assigned to a specific user or group of users by another user having owner-level or super-owner level to the particular presentation file, in this case File_n.

In the embodiment of FIG. 5, a group of users may be constructed by consensus of the user that comprise the group. The owner of a target file may then associate the construed group of users to the target file. Alternatively, an owner-level User or super-owner level user of a target file may construct a user group and associate it with the target file.

Figure 6:
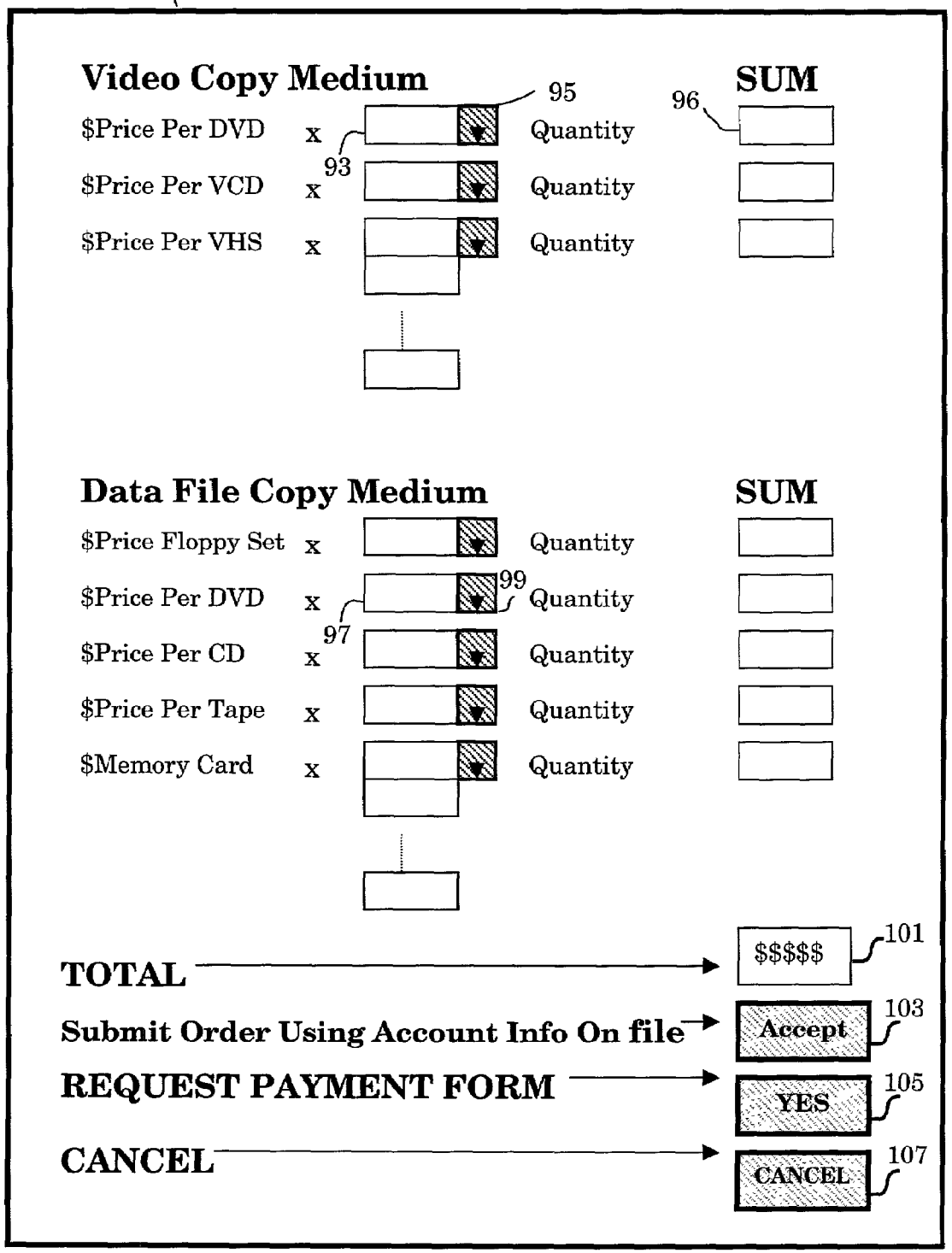
FIG. 6 is an exemplary electronic purchase form in accord with the present invention.

With reference to FIG. 6, when a user submits a purchase request to network server 13 for a target presentation file to which the user has purchase permission, the user is provided over the internet with an electronic purchase form 91. In the present example, the user may select among multiple types of video recording mediums or data file recording mediums. Of course, if the user is restricted to a specific one of the video type copy and data type copy, then only the recording options for the specific type of copy will be made available.

For each type of copy, multiple recording mediums are provided for selection. For example, for video recordings, it is preferred that a video DVD, a video Cd (i.e. VCD), or a video cassette (PAL or NTSC format) be provided. A user enters the number of copies desired in the appropriate field, such as field 93 for the DVD option, or can select from a pull-down menu a listing various copy packages by selecting down-arrow 95. For example, the user may gain a reduced price per copy by opting to chose one of the available copy packages, which preferably are copy quantities that increase in increments of five copies.

Similarly, for data file copies, it is preferred that a floppy disk set, a data DVD, a data Cd, a data tape, or a solid state memory medium (such as a nonvolatile memory card) be provided. A user submits the number of copies desired for each medium in the appropriate field (with zero by default).

This can be done, for example, by entering the number of CD copies desired in field 97, or by optionally calling a pull-down menu by selecting down-arrow 99 to chose from a list of available copy packages.

When selecting either of a video or data copy, the sum for the number of copies of a particular medium is listing in it corresponding Sum field. That is, if the user selects 2 DVD video copies, and each DVD copy costs $10, the a sum of $20 would be displayed in adjacent Sum Field 96. Whenever any of the recording medium quantities is changed, its corresponding Sum field is preferably automatically updated as well. A total of all Sum fields is listed in Total field 101. When all selections are complete, the user can either submit the purchase order using pre-submitting payment options by selecting Accept option 103, request an electronic payment form by selecting option 105, or cancel the purchase request by selecting the Cancel option 107.

With reference to FIG. 7, if the user requests an electronic payment form then network server 13 may present the user with exemplary payment form 111. The user may then fill-in the Name and Address field to which the copies should be mailed, and elect a payment method by selecting from any of a bill option 113, a credit card option 115, and a bank draft option 117. Alternatively, the user may cancel the purchase request by selecting Cancel option 121, or may continue with the purchase by selecting Proceed option 119.

If the user selects Bill option 113, the a bill for the cost of the copies may be mailed to the user. Alternatively, if the user pays a periodic subscription fee to gain access to network server 13, then the cost of the copies may be added to the next due subscription bill.

If the user selects Bank Draft option 117, then the charges are preferably withdrawn by automatic transfer from a bank account previously submitted by the user.

If the user selects the credit card option, then the user is presented with electronic form 131 of FIG. 8. The user may select from one of multiple charge card options, i.e. card_1 through card_n. The card's number is entered in field 132 and the expiration data is entered in field 133. This transaction is then completed when Submit option 135 is selected, or the transaction is canceled by selection option 137.

Any or all of the above payment options, recording type (video or data), recording medium (DVD, CD, cassette, etc.), and quantity of copies may be pre-submitted by the user to network server 13. In this case, when the user a submits purchase request to network user 13, the user can elect to have the transaction completed automatically using the pre-submitted options. That is, when a purchase request is submitted using this automatic completion option, network server will look up the user's pre-submitted preference, and select the type of copy (video or data), select the type of recording medium (DVD, CD, Cassette, etc.), select the type of payment option (bank draft, bill, etc.), the necessary payment information, and select the shipping address. Network server 13 then completes the purchase transaction using these options. The pre-submitted purchase options, however, are superceded by available permission levels. For example, if a user has pre-submitted "data file type" as its preferred file type copy, but the user has only buyer level purchase permission, and its buyer-level purchase permission restricts the user to purchasing a video type copy, then network server 13 will make the appropriate change and inform the user. That is, network server 13 will change the file type copy selection from data type to video type, and then ask the user for consent to the change. If the user agrees, then the purchase proceeds automatically in the above described manner.

What is claimed is:

1. An Internet presentation creation and access system comprising:
    a network server for controlling the user-creation and user-execution access of presentation files over the Internet, and for maintaining a store of previously user-created presentation files, the network server maintaining a user-database of registered users and a grouping-database of user-to-presentation_file grouping information, wherein said user-to-presentation file grouping information includes a created-file group associating each respective registered user to presentation files created by the respective registered user, an executable file group associating each respective registered user to presentation files to which the respective registered has execution access, and a purchasable-file group associating each respective registered user to presentation files to which the respective registered user has previously been granted purchase access;
    a user-access device for communicating with the network server over the Internet, and for submitting user-identification information to the network server; and
    wherein the network server responds to the user-identification information identifying a target user within the user-database of registered users by granting the user-access device the file access permissions associated with the target user, and accepting purchase orders for only those presentation files whose purchasable-file group associates the target user.

2. The internet presentation creation and access system of claim 1, wherein a first registered user becomes associated with a specific purchasable-file group by being granted purchase access by a second registered user.

3. The internet presentation creation and access system of claim 2, wherein said second registered user is the creator of the presentation file to whose purchasable-file group said first registered user becomes associated.

4. The internet presentation creation and access system of claim 1, wherein said target user may grant to, and withdraw from, a second registered user purchase permission of a presentation file associated with said target user's created-file group.

5. The internet presentation creation and access system of claim 1, wherein said target user may grant to, and withdraw from, a second registered user file execution permission of presentation files associated with said target user's created-file group.

6. The internet presentation creation and access system of claim 1, wherein said target user may optionally associate an access password with a presentation file within said target users corresponding created-file group;
    wherein all presentation files having an associated access password form a password-accessible group of presentation files, a listing of presentation files within said password-accessible group being made viewable to a plurality of selected registered users granted password access.

7. The internet presentation creation and access system of claim 6, wherein said plurality of selected registered users are selected by said target user.

8. The internet presentation creation and access system of claim 6, wherein said network server provides each registered user a listing of all password-accessible presentation files to which the respective registered user has been granted password access.

9. The internet presentation creation and access system of claim 6, wherein the registered users within said user-database are further associated with various user groups, and said target user associates at least one of said user groups with a target presentation file within the target user's password accessible group, all the members of the associated user group thereby being given password access to said target presentation file.

10. The internet presentation creation and access system of claim 6, wherein said access password is an execution-access password permitting execution access to said plurality of selected registered users upon their respective submission of said execution-access password to said network server.

11. The internet presentation creation and access system of claim 6, wherein said access password is a purchase-access password permitting purchase access to said plurality of selected registered users upon their respective submission of said purchase-access password to said network server.

12. The internet presentation creation and access system of claim 6, wherein said access password is an edit-access password permitting edit access to said plurality of selected registered users upon their respective submission of said edit-access password to said network server.

13. The internet presentation creation and access system of claim 1, wherein said network server permits said user-access device to grant a second registered user purchase permission to a target presentation file within said target user's associated created-file group by submitting to said network server identification information associated with said second registered user;
said network server further responding to the granting of purchase permission of said target presentation file by listing said target presentation file in said second register user's purchasable-file group.

14. The internet presentation creation and access system of claim 1, wherein said registered users are granted access to said network server based on a periodic paid subscription basis, and said network server responds to said user-access device submitting a purchase order for said target presentation file by adding the cost of the purchased presentation file to the cost of said target user's next-due periodic subscription price.

15. The internet presentation creation and access system of claim 1, wherein when said user-access device submits a request for purchase of said target presentation file, said user-access device additional submits a preferred file type option, said preferred file type option including at least one of a video type and a computer executable type.

16. The internet presentation creation and access system of claim 15, wherein said video type consists of a video recording of an execution of said target presentation file, and wherein said computer executable type is a data file of predefined data format for execution by a computing device having a pre-identified, presentation execution, computer program.

17. The internet presentation creation and access system of claim 15, wherein said network server responds to said user-access device submitting said video type as its preferred file type option by requesting that said user-access device select a recording medium from among a group including at least one of a video DVD, a VCD, and a Video Cassette; and wherein said network server further responds to said user-access device submitting said computer executable type as its preferred file type option by requesting that said user-access device select a recording medium from among a group including at least one of a data DVD, a data CD, and a computer readable magnetic data recording medium.

18. The internet presentation creation and access system of claim 1, wherein said network server further maintains, for at least one specific registered user within said user-database, purchase options pre-submitted by said specific registered user, said pre-submitted purchase options including at least one of a payment option, a file type option, and recording medium option, wherein upon the submission of a purchase request by said specific registered user for a target presentation file, said specific registered user may optionally instruct said network server to complete the purchase request using the specific registered user's pre-submitted purchase options.

19. The internet presentation creation and access system of claim 18, wherein said payment option includes one of an added charge to a periodic subscription price for access to said network server, a charge to a pre-identified charge card, an automatic withdraw from a pre-identified bank account, and an issuance of a bill for payment to said respective registered user.

20. The internet presentation creation and access system of claim 18, wherein said recording medium option includes at least one of a video DVD, a data DVD, a VCD, a data CD, a video cassette, and a computer readable magnetic data storage medium.

21. The internet presentation creation and access system of claim 18, wherein said preferred file type option includes at least one of a video type and a computer executable type;
said video type being a video recording of an execution of the purchased presentation file, and said computer executable type being a data file of predefined format for execution by a computing device using a pre-identified, presentation execution, computer program.

22. The internet presentation creation and access system of claim 21, wherein if said preferred file type option is said video type, then said recording medium option is selected from at least one of a video DVD, a VCD, and a Video Cassette; and
if said preferred file type option is said computer executable type, then said recording medium option is selected from at least one of a data DVD, a data CD, and a magnetic recording medium.

23. An Internet presentation creation and access system comprising:
a data store maintaining a plurality of user-created presentation files;
a network server having access to said data store and effective for controlling user-creation access, user-edit access, user-execution access, and user-purchase access of said plurality of presentation files over the Internet, said network server maintaining a user-database of registered users and corresponding identification data for each of said registered users;
a plurality of remote access devices for communicating with said network server over the Internet, each of said remote access devices being associated with a specific registered user within said user-database upon submission to said network server of the specific registered user s corresponding identification data;
wherein said server further maintains a correlation between selected registered users and an edit permission group, an execution permission group, and purchase permission group, and a user-created group for each of said plurality of presentation files, said network server permitting edit access to a target presentation file only to those registered users correlated to said target presentation file's edit permission group, said network server permitting execution access to said target presentation file only to those registered users correlated to said target presentation file's execution permission group, and said network server permitting purchase access to said target presentation file only to those registered users correlated to said target presentation file's purchase permission group.

24. The internet presentation creation and access system of claim 23, wherein the registered users within each purchase permission group are assigned at least one of an owners status and a buyer status, the registered users having said owner status being permitted to incorporate at least one additional registered user into their respective purchase permission group and to assign the newly incorporated registered user at least one of said owner status and buyer status;

the registered users having said owner status being further permitted to remove from their respective permission group any registered user not having said owner status.

25. The internet presentation creation and access system of claim 24, wherein the registered users having only said buyer status are denied permission to add or remove any other registered user into, or out of, their respective purchase permission group.

26. The internet presentation creation and access system of claim 24, wherein the creator of a new presentation file is automatically assigned owner status within the purchase permission group for the newly created presentation file.

27. The internet presentation creation and access system of claim 26, wherein the creator of said new presentation file is further permitted to remove any other registered user from its new presentation file's corresponding purchase permission group.

28. The internet presentation creation and access system of claim 24, wherein the registered users having owner status within the purchase permission group of a specific presentation file are automatically incorporated in the same specific presentation file's edit permission group and execution permission group.

29. The Internet presentation creation and access system of claim 24, wherein the registered users having owner status within the purchase permission group of a specific presentation file are further effective for incorporating of removing other registered users into, or out of, the same specific presentation file's edit permission group and execution permission group.

30. The Internet presentation creation and access system of claim 24, wherein said network server further divides the registered users within said user-database into various user groups, and a registered user having said owner status within the purchase permission group of a specific presentation file is effective for assigning either of said owner status and buyer status to a selected one of said various user groups, said network server assigning all the registered users within the selected user group the same buyer status or owner status as assigned to the selected user group.

31. The Internet presentation creation and access system of claim 30, wherein said registered user having said owner status within the purchase permission group of said specific presentation file is effective for removing from said purchase permission group any user group having only said buyer status.

32. The internet presentation creation and access system of claim 24, wherein one of the registered users having said owner status within the purchase permission group of a specific presentation file is further assigned a super-owner status, the registered user having said super-owner status being permitted to remove from its respective purchase permission group any other registered user having said owner status.

33. The Internet presentation creation and access system of claim 32, wherein the registered user having said super-owner status is a first registered user and is further permitted to relinquish said first register user's super-owner status to a second registered user within said first register user's corresponding purchase permission group.

34. The internet presentation creation and access system of claim 23, wherein said registered users are granted access to said network server based on a periodic paid subscription basis, and said network server responds to one of said user-access devices submitting a purchase order for a presentation file by adding the cost of the purchased presentation file to the cost of the next-due periodic subscription price of the specific registered user associated with the user-access device that submitted the purchase order.

35. The internet presentation creation and access system of claim 23, wherein when one of said user-access devices submits a request for purchase of a target presentation file, the requesting user-access device additional submits a preferred file type option, said preferred file type option including at least one of a video type and a computer executable type.

36. The internet presentation creation and access system of claim 35, wherein said video type consists of a video recording of an execution of said target presentation file, and wherein said computer executable type is a data file of predefined data format for execution by computing device running a pre-identified, presentation execution, computer program.

37. The Internet presentation creation and access system of claim 35, wherein said network server responds to said one of said user-access devices submitting said video type as a preferred file type option by requesting that a selection of recording medium be made from among a group including at least one of a video DVD, a VCD, and a Video Cassette; and wherein said network server further responds to said one of said user-access devices submitting said computer executable type as a preferred file type option by requesting that a selection of recording medium be made among the group including at least one of a data DVD, a data CD, and a computer readable magnetic data recording medium.

38. The internet presentation creation and access system of claim 23, wherein said network server further maintains, for at least one respective registered user within said user-database, purchase options pre-submitted by said respective registered user, said pre-submitted purchase options including at least one of a payment option, a file type option, and a recording medium option, wherein upon the submission of a purchase request by said respective registered user for a selected presentation file, said respective registered user may optionally instruct said network server to complete the purchase request using said respective user's pre-submitted purchase options.

39. The internet presentation creation and access system of claim 38, wherein said payment option includes one of an added charge to a periodic subscription price for access to said network server, a charge to a pre-identified charge card, an automatic withdraw from a pre-identified bank account, and an issuance of a bill for payment to said respective registered user.

40. The internet presentation creation and access system of claim 38, wherein said recording medium option includes at least one of a video DVD, a data DVD, a VCD, a data CD, a video cassette, and a computer readable magnetic data storage medium.

41. The internet presentation creation and access system of claim 38, wherein said preferred file type option includes at least one of a video type and a computer executable type;
   said video type being a video recording of an execution of the purchased presentation file, and said computer executable type being a data file of predefined format for execution by a computing device using a pre-identified, presentation execution, computer program.

42. The internet presentation creation and access system of claim 41, wherein if said preferred file type option is said video type, then said recording medium option is selected from at least one of a video DVD, a VCD, and a Video Cassette; and
   if said preferred file type option is said computer executable type, then said recording medium option is selected from at least one of a data DVID, a data CD, and a magnetic recording medium.

43. A method for Internet presentation creation and access comprising:
   providing a network server having a presentation creation service accessible over the Internet and controlling Internet access to a plurality of user-created presentation files;
   maintaining on said network server a user-database of registered users and corresponding identification data for each of said registered users;
   assigning each of said registered users various types of access permissions for selected presentation files, said types of access permissions including edit access permission, execution access permission, and purchase permission;
   maintaining on said network server a grouping-database of user-to-presentation_file grouping information, wherein said user-to-presentation_file grouping information includes a created-file group associating each respective registered user to presentation files created by the respective registered user, an executable-file group associating each respective registered user to presentation files to which the respective registered has execution access, and a purchasable-file group associating each respective registered user to presentation files to which the respective registered user has previously been granted purchase access;
   providing a remote Internet access device for communicating with said network server over the Internet;
   associating said remote Internet access device with a target user within said user-database upon submission by said remote Internet access device to said network server of said target user's corresponding identification data;
   using said remote Internet access device to submit to said network server a purchase order for a target presentation file;
   accepting said purchase order for said target presentation file only if said target user has purchase permission for said target presentation file.

44. The method of claim 43 further including the step of, for each presentation file for which a respective registered user has purchase permission, assigning said respective registered user one of an owner status and a buyer status, and permitting respective registered users that have owner status to assign purchase permission to other registered users.

45. The method of claim 44, further including the step of permitting respective registered users that have said owner status to remove purchase permission from other of said respective registered users that do not have owner status.

46. The method of claim 44, further including the step of permitting respective registered users that have owner status to further assign one of said owner status and buyer status to each of said other registered users when granting said other registered users purchase permission.

47. The method of claim 44, further including the step of not permitting respective registered users that do not have said owner status to modify the purchase permission of other registered users.

48. The method of claim 44 wherein a plurality of said respective registered users have said owner status, said method further including the step of assigning a super-owner status to at least one respective registered user that has said owner status, and permitting the respective registered user that has said super-owner status to remove at least one of said owner status and purchase permission from any other of said respective registered users that do not have said super-owner status.

49. The method of claim 48 further including the step of permitting the respective registered user that has said super-owner status to relinquish its super-owner status to another of said respective registered users.

50. The method of claim 43, further including the step of granting said registered users access to said network server based on a periodic paid subscription basis, and having said network server respond to said remote internet access device submitting a purchase order for said target presentation file by adding the cost of said target presentation file to the cost of the next-due periodic subscription price of said target user.

51. The method of claim 43, further including a step of, when said remote internet access device submits said purchase order for said target presentation file, having said remote internet access device additionally submit a preferred file type option, said preferred file type option including at least one of a video type and a computer executable type.

52. The method of claim 51, wherein said video type consists of a video recording of an execution of said target presentation file, and wherein said computer executable type is a data file of predefined data format for execution by a computing device running a pre-identified, presentation execution, computer program.

53. The method of claim 51, wherein said network server responds to said remote Internet access device submitting said video type as a preferred file type option by requesting that a selection of recording medium be made from among a group including at least one of a video DVD, a VCD, and a Video Cassette; and
   wherein said network server further responds to said remote Internet access devices submitting said computer executable type as a preferred file type option by requesting that a selection of recording medium be made among the group including at least one of a data DVD, a data CD, and a magnetic recording medium.

54. The method of claim 43, further including a step of maintaining on said network server, for at least one respective registered user within said user-database, purchase options pre-submitted by said respective registered user, said pre-submitted purchase options including at least one of a payment option, a file type option, and recording medium option;
- wherein if said respective user is said target user, along with said purchase order, said remote internet access device may optionally instruct said network server to complete said purchase order using said respective user's pre-submitted purchase options.

55. The method of claim 54, wherein said payment option includes one of an added charge to a periodic subscription price for access to said network server, a charge to a pre-identified charge card, an automatic withdraw from a pre-identified bank account, and an issuance of a bill for payment to said respective registered user.

56. The method of claim 54, wherein said recording medium option includes at least one of a video DVD, a data DVD, a VCD, a data CD, a video cassette, and a computer readable magnetic data storage medium.

57. The method claim 54, wherein said preferred file type option includes at least one of a video type and a computer executable type;
- said video type being a video recording of an execution of said target presentation file, and said computer executable type being a data file of predefined format for execution by a computing device using a pre-identified, presentation execution, computer program.

58. The method of claim 57, wherein if said preferred file type option is said video type, then said recording medium option is selected from at least one of a video DVD, a VCD, and a Video Cassette; and
- if said preferred file type option is said computer executable type, then said recording medium option is selected from at least one of a data DVD, a data CD, and a magnetic recording medium.

\* \* \* \* \*